US009665978B2

(12) United States Patent
Chuang et al.

(10) Patent No.: US 9,665,978 B2
(45) Date of Patent: May 30, 2017

(54) CONSISTENT TESSELLATION VIA TOPOLOGY-AWARE SURFACE TRACKING

(71) Applicant: Microsoft Technology Licensing, LLC, Redmond, WA (US)

(72) Inventors: Ming Chuang, Bellevue, WA (US); Alvaro Collet Romea, Seattle, WA (US); Pat Sweeney, Woodinville, WA (US); Steve Sullivan, Clyde Hill, WA (US); Don Gillett, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 18 days.

(21) Appl. No.: 14/803,687

(22) Filed: Jul. 20, 2015

(65) Prior Publication Data

US 2017/0024930 A1    Jan. 26, 2017

(51) Int. Cl.
*G06T 17/20*    (2006.01)
*G06T 7/20*    (2017.01)

(52) U.S. Cl.
CPC .............. *G06T 17/205* (2013.01); *G06T 7/20* (2013.01); *G06T 17/20* (2013.01)

(58) Field of Classification Search
CPC .............................. G06T 17/20; G06T 17/205
USPC ........................................ 345/419, 420, 423
See application file for complete search history.

(56) References Cited

U.S. PATENT DOCUMENTS

| 6,016,150 A | 1/2000 | Lengyel et al. |
| 6,232,974 B1 | 5/2001 | Horvitz et al. |
| 6,326,964 B1 | 12/2001 | Snyder et al. |
| 6,809,731 B2 | 10/2004 | Muffler et al. |
| 7,174,050 B2 | 2/2007 | Balmelli et al. |
| 7,583,275 B2 | 9/2009 | Neumann et al. |

(Continued)

FOREIGN PATENT DOCUMENTS

| CA | 2194834 C | 9/2001 |
| WO | 9844445 B1 | 3/1999 |
| WO | 2013174671 A1 | 11/2013 |

OTHER PUBLICATIONS

Schwarz, Michael, and Marc Stamminger. "Fast GPU-based Adaptive Tessellation with CUDA." Computer Graphics Forum 28.2 (2009): 365-374.*

(Continued)

*Primary Examiner* — Kimberly A Williams
(74) *Attorney, Agent, or Firm* — Mark K. Young; Mayer & Williams PC

(57) ABSTRACT

Consistent tessellation via topology-aware surface tracking is provided in which a series of meshes is approximated by taking one or more meshes from the series and calculating a transformation field to transform the keyframe mesh into each mesh of the series, and substituting the transformed keyframe meshes for the original meshes. The keyframe mesh may be selected advisedly based upon a scoring metric. An error measurement on the transformed keyframe exceeding tolerance or threshold may suggest another keyframe be selected for one or more frames in the series. The sequence of frames may be divided into a number of subsequences to permit parallel processing, including two or more recursive levels of keyframe substitution. The transformed keyframe meshes achieve more consistent tessellation of the object across the series.

20 Claims, 8 Drawing Sheets

(56) References Cited

U.S. PATENT DOCUMENTS

| | | | |
|---|---|---|---|
| 7,812,850 B1* | 10/2010 | Nelson | G06T 19/20 345/420 |
| 7,830,381 B2 | 11/2010 | Lundstrom et al. | |
| 8,587,594 B2 | 11/2013 | Mejdrich et al. | |
| 8,681,154 B1 | 3/2014 | Gardiner | |
| 2003/0123751 A1 | 7/2003 | Krishnamurthy et al. | |
| 2004/0221053 A1 | 11/2004 | Codella | |
| 2007/0103460 A1 | 5/2007 | Zhang | |
| 2008/0196076 A1 | 8/2008 | Shatz | |
| 2010/0182406 A1 | 7/2010 | Benitez | |
| 2010/0226534 A1 | 9/2010 | Doria | |
| 2011/0069224 A1 | 3/2011 | Gross | |
| 2012/0050481 A1 | 3/2012 | Chen et al. | |
| 2012/0056982 A1 | 3/2012 | Katz | |
| 2012/0221297 A1 | 8/2012 | Nanson et al. | |
| 2012/0313927 A1* | 12/2012 | Curington | G06T 9/001 345/419 |
| 2013/0106834 A1* | 5/2013 | Curington | G06T 9/00 345/419 |
| 2013/0271463 A1* | 10/2013 | Curington | G06T 9/001 345/420 |
| 2014/0002597 A1 | 1/2014 | Taguchi et al. | |
| 2014/0098090 A1* | 4/2014 | Schmidt | G06T 17/20 345/419 |
| 2014/0132604 A1 | 5/2014 | Bao et al. | |
| 2014/0184598 A1 | 7/2014 | Quilot et al. | |
| 2014/0184599 A1 | 7/2014 | Quilot et al. | |
| 2015/0178988 A1 | 6/2015 | Montserrat Mora | |

OTHER PUBLICATIONS

Bénard, Pierre, Aaron Hertzmann, and Michael Kass. "Computing Smooth Surface Contours with Accurate Topology." TOG ACM Trans. Graph. ACM Transactions on Graphics 33.2 (2014): 1-21.*
Prada, Fabian, Misha Kazhdan, Ming Chuang, Alvaro Collet and Hugues Hoppe. "Motion Graphs for Unstructured Textured Meshes." ACM Trans. Graphics (SIGGRAPH), 35(4), (2016): Article No. 108, 14 pages.*
Shan, et al., "Occluding Contours for Multi-View Stereo", In Proceedings of Conference on Computer Vision and Pattern Recognition, Jun. 24, 2014, (8 pages total).
Cheung, et al.,"Visual Hull Alignment and Refinement across Time: A 3D Reconstruction Algorithm Combining Shape-From-Silhouette with Stereo", In Proceedings of IEEE Computer Society Conference on Computer Vision and Pattern Recognition, vol. 2, Jun. 18, 2003, (8 pages total).
Li, et al., "Combining Stereo and Visual Hull Information for On-line Reconstruction and Rendering of Dynamic Scenes", In Proceedings of IEEE Workshop on Multimedia Signal Processing, Dec. 9, 2002, (4 pages total).
Cremers, et al., "Multiview Stereo and Silhouette Consistency via Convex Functionals over Convex Domains", In Journal of IEEE Transactions on Pattern Analysis and Machine Intelligence, vol. 33, Issue 6, Jun. 1, 2011, (14 pages total).
Lin, et al., "3D Reconstruction by Combining Shape from Silhouette with Stereo", In Proceedings of 19th International Conference on Pattern Recognition, Dec. 8, 2008, (4 pages total).
Sinha, et al., "Multi-view Reconstruction using Photo-consistency and Exact Silhouette Constraints: A Maximum-Flow Formulation", In Proceedings of Tenth IEEE International Conference on Computer Vision, , vol. 1, Oct. 17, 2005, (8 pages total).
Goesele, et al., "Multi-View Stereo Revisited", In Proceedings of IEEE Computer Society Conference on Computer Vision and Pattern Recognition, , vol. 2, Jun. 17, 2006, (8 pages total).
Labatut, et al., "Efficient Multi-View Reconstruction of Large-Scale Scenes using Interest Points, Delaunay Triangulation and Graph Cuts", In Proceedings of IEEE 11th International Conference on Computer Vision, Oct. 14, 2007, (8 pages total).
Sinha, et al., "Multi-View Stereo via Graph Cuts on the Dual of an Adaptive Tetrahedral Mesh", In Proceedings of IEEE 11th International Conference on Computer Vision, Oct. 14, 2007, (8 pages total).

Bleyer, et al., "PatchMatch Stereo—Stereo Matching with Slanted Support Windows", In British Machine Vision Conference, Aug. 29, 2011, (2 pages total).
Furukawa, et al., "Carved Visual Hulls for Image-Based Modeling", In International Journal of Computer Vision, vol. 81, Issue 1, Jan. 2009, (15 pages total).
Furukawa, et al., "Accurate, Dense, and Robust Multiview Stereopsis", In IEEE Transactions on Pattern Analysis and Machine Intelligence, vol. 32, Issue 8, Aug. 2010, (8 pages total).
Esteban, et al., "Silhouette and Stereo Fusion for 3D Object Modeling", In Proceedings of Computer Vision and Image Understanding, vol. 96, Issue 3, Dec. 2004, (27 pages total).
Song, et al., Volumetric Stereo and Silhouette Fusion for Image-Based Modeling, In Journal of the Visual Computer, vol. 26, Issue 12, Dec. 1, 2010, (8 pages total).
Pass, et al., "Comparing Images Using Joint Histograms", ACM Journal of Multimedia Systems, vol. 7, No. 3, pp. 234-240 (1999) (15 pages total).
Grad Project: 3D Printing, Retrieved from :http://lloydramsay-gradproject.blogspot.com, Oct. 19, 2011; Retrieved on Jun. 17, 2015 (20 pages total).
Havemann, et al., "Progressive Combined B-reps—Multi-Resolution Meshes for Interactive Real-time Shape Design", In Proceedings of 16th International Conference in Central Europe on Computer Graphics, Visualization and Computer Vision, Feb. 4, 2008, (16 Pages total).
Boubekeur, et al., "Generic Adaptive Mesh Refinement", Published on: Dec. 12, 2008 Available at: http://http.developer.nvidia.com/GPUGems3/gpugems3_ch05.html (14 pages total).
Dyken, et al., "Semi-Uniform Adaptive Patch Tessellation", In Proceedings of Computer Graphics Forum, vol. 28, Issue 8, Dec. 2009, pp. 1-9 (9 pages total).
Zhang, et al., "An Efficient Method of Key-Frame Extraction Based on a Cluster Algorithm", In Journal of Human Kinetics, vol. 39, Dec. 18, 2013, pp, 5-13 (9 pages total).
Xiao, et al., "An Efficient Keyframe Extraction from Motion Capture Data", In Proceedings of 24th International Conference on Advances in Computer Graphics, Jun. 26, 2006, (2 Pages total).
Meyer, et al., "Particle-based Sampling and Meshing of Surfaces in Multimaterial Volumes", In Journal of IEEE Transactions on Visualization and Computer Graphics, vol. 14, Issue 6, Nov. 1, 2008, (8 pages total).
Zhou, et al., "Large Mesh Deformation Using the Volumetric Graph Laplacian", In Proceedings of ACM SIGGRAPH, vol. 24, Issue 3, Jul. 31, 2005, pp. 496-503 (8 pages total).
"Shape Uncertainty and Variability", Published on: Oct. 16, 2010 Available at: http://lgg.epfl.ch/research.php?p=7 (8 pages total).
"Deforming Surfaces and Using the Mesh Modifiers in 3ds Max", Retrieved on: Nov. 12, 2014 Available at: http://3dmaxhub.com/deforming-surfaces-and-using-the-mesh-modifiers-in-3ds-max/ (24 pages total).
Kazhdan, et al., "Poisson Surface Reconstruction", In Proceedings of Eurographics Symposium on Geometry Processing, Jun. 2006, (10 pages total).
Li, et al., "Robust Single-View Geometry and Motion Reconstruction", In Journal of ACM Transactions on Graphics, vol. 28, Issue 5, Dec. 2009, (10 pages).
Brown, et al., "Visual Attention-based Polygon Level of Detail Management", In Proceedings of the 1st International Conference on Computer Graphics and Interactive Techniques in Australasia and South East Asia, Feb. 2003, (8 pages total).
Bible, John, "Attentional Flow Networks: A Real-Time Adaptive Display Technique", In Thesis of Master of Science, Aug. 18, 2000, (175 pages total).
Brown, et al., "Visual Importance-biased Image Synthesis Animation", In Proceedings of the 1st International Conference on Computer Graphics and Interactive Techniques in Australasia and South East Asia, Feb. 2003, (9 pages total).
Lengyel, et al., "Rendering with Coherent Layers", In Proceedings of the 24th Annual Conference on Computer Graphics and Interactive Techniques, Aug. 1997, (10 pages total).

(56) References Cited

OTHER PUBLICATIONS

"Microsoft Research Face SDK Beta", Retrieved on: Nov. 19, 2014, Available at: http://research.microsoft.com/en-us/projects/facesdk/ (2 pages total).
"Skeletal Tracking", Retrieved on: Nov. 19, 2014, Available at: http://msdn.microsoft.com/en-us/library/hh973074.aspx (3 pages total).
Hoppe, Hugues, "New Quadric Metric for Simplifying Meshes with Appearance Attributes", In Proceedings of the 10th IEEE Visualization Conference, Oct. 1999, (8 pages total).
"Using UVAtlas (Direct3D 9)", Retrieved on: Nov. 19, 2014, Available at: http://msdn.microsoft.com/en-us/library/windows/desktop/bb206321(v=vs.85).aspx (5 pages total).
Catmull, et al., "Recursively Generated B-Spline Surfaces on Arbitrary Topological Meshes", In Proceedings of Computer-Aided Design, vol. 10, Issue 6, Nov. 1978, pp. 350-355. (6 pages total).
Chen, et al., "Scalable Real-Time Volumetric Surface Reconstruction", In Proceedings of ACM Transactions on Graphics, vol. 32, No. 4, Jul. 2013, (2 pages total).
Alexa, et al., "Point Set Surfaces", In Proceedings of the conference on Visualization, Oct. 21, 2001, (8 pages total).
Clark, James. H., "Hierarchical Geometric Models for Visible Surface Algorithms", In Proceedings of Communications of the ACM, vol. 19, Issue 10, Oct. 1976, (8 pages total).
Williams, Lance, "Pyramidal Parametrics", In Proceedings of ACM SIGGRAPH Computer Graphics, vol. 17, Issue 3, Jul. 1983, (11 pages total).
Nieβner, et al., "Feature-Adaptive GPU Rendering of Catmull-Clark Subdivision Surfaces", In Journal ACM Transactions on Graphics, vol. 31, Issue 1, Jan. 2012, (11 pages total).
Akbarzadeh et al., Towards Urban 3D Reconstruction From Video, Proceedings of the Third International Symposium on 3D Data Processing, Visualization, and Transmission (3DPVT'06), 2006, (8 pages total).
"International Search Report and Written Opinion Issued in PCT Application No. PCT/US2016/037459", Mailed Date: Sep. 7, 2016, (13 Pages total).
Merrell, et al., "Real-Time Visibility Based Fusion of Death Maps", In Proceedings of the IEEE 11th International conference on Computer Vision, Oct. 14, 2007, (8 Pages total).
Pauly, et al., "Uncertainty and Variability in Point Cloud Surface Data", In the Proceeding of Eurographics Symposium on Point-Based Graphics, Jan. 2004, (8 Pages total).
Wheeler, et al., "Consensus Surfaces for Modeling 3D Objects from Multiple Range Images", In the International Conference on Computer Vision, Jan. 1, 1998, pp. 917-924. (8 Pages total).
Hornung, et al., "Robust Reconstruction of Watertight 3D Models from Non-Uniformly Sampled Point Clouds Without Normal Information", In the Proceeding of Eurographics Symposium of Geometry Processing, Jan. 2006, (10 Pages total).
Schnabel, et al., "Efficient RANSAC for Point-Cloud Shape Detection", In the Forum of Computer Graphics, vol. 26, Issue 2, Jun. 1, 2007, pp. 214-226 (13 Pages total).
Qu, Lijun, and Gary W. Meyer. "Perceptually guided polygon reduction." IEEE Transactions on Visualization and Computer Graphics 14.5 (2008): 1015-1029. (15 Pages total).
"International Search Report and Written Opinion Issued in PCT Application No. PCT/US2016/042174", Mailed Date: Oct. 21, 2016, (12 Pages total).
Zeineb Abderrahim, Hanen Jeder, Mohamed Salim Bouhlel: "Interactive multiresolution visualization of 3D mesh", International Journal of Computer Applications, vol. 67, No. 14, Apr. 2013, pp. 1-7.
Heckbert, P.S., et al: "Multiresolution modeling for fast rendering", Proceedings. Graphics Interface 94, May 18, 1994, pp. 43-50, Alberta, Canada (8 pages total).
Javier Lluch et al: "Multiresolution 3D Rendering on Mobile Devices", Jan. 1, 2006, Computational Science—ICCS 2006 Lecture Notes in Computer Science; LNCS, Springer, Berlin, DE, pp. 287-294 (8 pages total).
Rodrigo Barni et al: "Salient Clustering for View-dependent Multiresolution Rendering", Computer Graphics and Image Processing (SIBGRAPI), 2009 XXII Brazilian Symposium on, IEEE, Piscataway, NJ, USA, Oct. 11, 2009, pp. 56-63, (8 pages total).
Abderrahim, et al., "Interactive Multiresolution Visualization of 3D Mesh", In the Proceedings of the International Journal of Computer Applications, vol. 67, Issue 14, Apr. 2013, (7 Pages total).
Barni, et al., "Salient Clustering for View-dependent Multiresolution Rendering", In 2009 XXII Brazilian Symposium on Computer Graphics and Image Processing, Oct. 11, 2009, pp. 56-63 (8 pages total).
Heckbert, et al., "Multiresolution Modeling for Fast Rendering", In the Proceedings of Graphics Interface, May 18, 1994, pp. 43-50 (8 pages total).
Lluch, et al., "Multiresolution 3D Rendering on Mobile Devices", In the Proceedings of Computational Science—ICCS 2006, vol. 3992 of the series Lecture Notes in Computer Science, Jan. 1, 2006, pp. 287-294 (8 pages total).
"International Search Report and Written Opinion Issued in PCT Application No. PCT/US2016/042174", Mailed Date: Oct. 21, 2016, (11 Pages total).
Anuar, et al. "Extracting Animated Meshes with Adaptive Motion Estimation", Retrieved From <<https://pdfs.semanticscholar.org/1f96/7ce471cdfb859cb6ed8207d8af25f968c015.pdf>>, Nov. 16, 2004, 9 Pages.
Cagniart, et al. "Iterative Deformable Surface Tracking in Multi-View Setups", In the proceedings of 3DPVT in International Symposium on 3D Data Processing, Visualization and Transmission, May 17, 2010, 9 Pages.
"International Search Report and Written Opinion Issued in PCT Application No. PCT/US2016/039474", Mailed Date: Oct. 27, 2016, 12 Pages.
"Second Written Opinion Issued in PCT Application No. PCT/US2016/042174", Mailed Date: Jan. 16, 2017, (6 Pages total).

\* cited by examiner

CONSISTENT TESSELLATION VIA TOPOLOGY-AWARE SURFACE TRACKING

BACKGROUND

Meshing a moving/animated three-dimensional (3D) object represented by a sequence of meshes is conventionally performed by running a surface reconstruction algorithm independently at each frame. This results in a set of meshes having completely different triangle connectivity (i.e., inconsistent tessellation). Without surface correspondences across multiple frames, many commonly performed tasks (data compression, color grading, visual effects, geometry editing, etc.) can become difficult.

SUMMARY

Consistent tessellation via topology-aware surface tracking is provided in which a series of meshes is approximated by taking one or more meshes from the series and calculating a transformation field to transform this keyframe meshes into each mesh of the series and substituting the transformed keyframe meshes for the original mesh. The keyframe mesh may be selected advisedly based upon a scoring metric. An error measurement on the transformed keyframe exceeding tolerance or threshold may suggest another keyframe be selected for one or more frames in the series. The sequence of frames may be divided into a number of subsequences to permit parallel processing, including two or more recursive levels of keyframe substitution. The transformed keyframe meshes achieve more consistent tessellation of the object across the series. The consistent tessellation may be implemented as a computer-enabled system that is operative to perform computations for keyframe selection, scoring, transformation, and substitution.

In various illustrative examples, the keyframe meshes may be selected advisedly based upon its suitability for adaptation to other meshes in the series. Factors that influence the suitability of a mesh for use as a keyframe may include, for example, the genus of the mesh, and the surface area of the mesh. An error measurement may be performed on the transformed keyframe against the original mesh to gauge their visual similarity, including for example Hausdorff distance, root mean square (RMS) error, or comparative visual similarity of the two rendered meshes. If an error exceeds tolerance or threshold, another keyframe may be selected.

To improve processing speed, the consistent tessellation via topology-aware surface tracking can provide for a degree of parallelism in which a sequence of frames may be divided in a number of subsequences. Each subsequence may be processed in parallel to determine one or more respective keyframes. The sequence of keyframes may be then processed to reduce to a minimum number of super keyframes. The super keyframes are then propagated back onto the subsequences, and eventually onto the original sequence of frames.

The above-described method may be advantageously implemented as a computer-enabled system. The system may be operative to perform the necessary computation for keyframe selection, scoring, transformation and substitution. Moreover, certain implementations of the system can further include a video capture system to capture image data of live action three-dimensional objects subsequently modified according to the presently disclosed principles of consistent tessellation via topology-aware surface tracking.

DESCRIPTION OF THE DRAWINGS

Like reference numerals indicate like elements in the drawings. Elements are not drawn to scale unless otherwise indicated.

DETAILED DESCRIPTION

When live action video is captured to generate a point cloud for computational definition and reproduction of three-dimensional objects, there may be a lack of correspondence in the point clouds and/or meshes defining the same 3D object from one frame of video to the next. Inconsistency in the tessellation of the 3D object within a single scene can degrade the visual fidelity of the reproduction. Other operations that may be desirable to perform on the reconstructed scene, including data compression, color and video editing, can be facilitated by a consistent tessellation model of object throughout the scene.

Traditional methods for meshing a moving/animated 3D object represented by a sequence of point clouds can be performed by running a surface reconstruction algorithm independently at each frame, for example as disclosed by Kazhdan, M., Bolitho, M., and Hoppe, H., Poisson Surface Reconstruction, *In Proc. of Symposium of Geometry Process*, Computer Graphics Forum, Eurographics Association, pp. 61-70 (2006) (hereinafter, "Kazhdan, et al. (2006)"). Unfortunately, this results in a set of meshes having completely different triangle connectivity. Without surface correspondences across multiple frames, many commonly performed tasks such as data compression, color grading, visual effects, geometry editing, and the like can become difficult.

Non-rigid surface registration approaches have also been used, for example as disclosed by Li, H., Adams, B., Guibas, L., and Pauly, M., *Robust Single-View Geometry and Motion Reconstruction*, ACM Transaction on Graphics, Proc. of SIGGRAPH Asia 2009, Vol. 28, No. 5 (hereinafter, "Li, et al. (2009)"). According to that disclosure, a template mesh of fixed topology is created and deformed to fit each frame. Unfortunately, this and other similar prior approaches are not capable of handling topology changes arising in the course of animation, which can limit their applicability in some scenarios.

Figure 1:
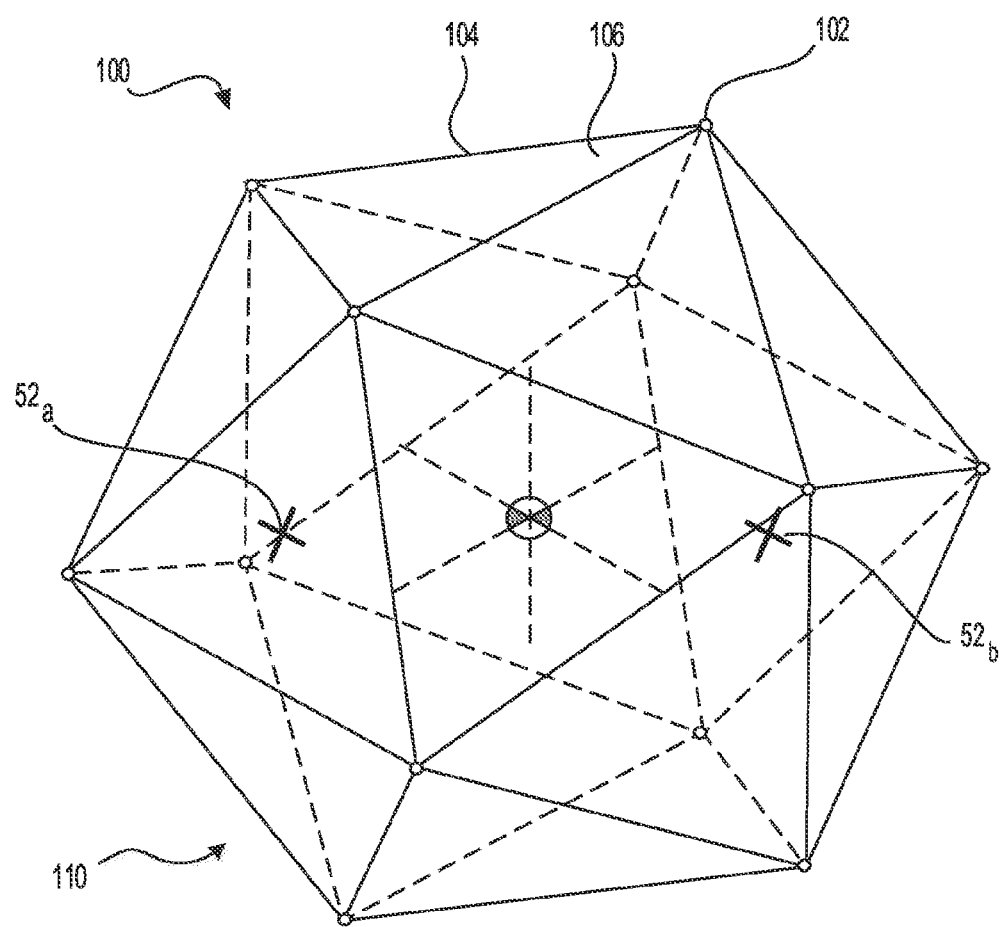
FIG. 1 shows an illustrative point cloud and wire mesh used to computationally describe a three-dimensional object.

Turning now to the drawings, an object may be modeled computationally by locating a collection of points on the surface of the object. With reference to FIG. 1, this collection of points 102 is termed a point cloud 100. To further describe the surface of the object, adjacent points 102 in the point cloud 100 are connected by lines 104, also termed edges. The combination of points 102 and edges 104 is referred to as a wire mesh 110, also termed a wire frame. Planar surfaces enclosed by edges 104 may be termed faces 106. Faces 106 may be colored, shaded, and/or have an image texture applied thereto representing the surface appearance of the object, for example indicia 52a, 52b.

Figure 2:
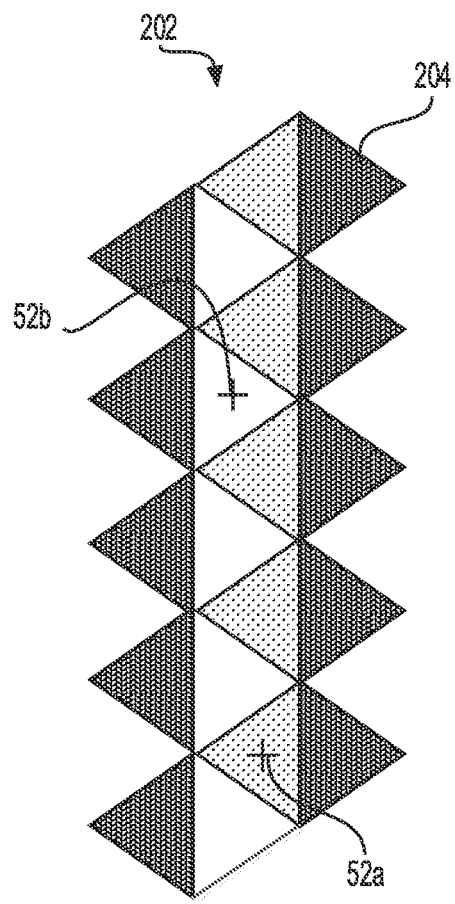
FIG. 2 shows an illustrative texture map for application to the wire mesh of FIG. 1 to represent the surface appearance of the three-dimensional object represented by the wire mesh.

Referring to FIG. 2, the collection of surface treatments for each of the faces 106 of a wire mesh 110, joined together and presented in a two-dimensional domain, is called a texture map 202. Each unit of the texture map 202 may be termed a texture element or texel 204, analogous to a pixel, or picture element of a digital picture. To render the 3D object, the wire mesh 110 is located and oriented in a virtual space to a specification, and the texture map 202 is applied to the faces 106 of the wire mesh 110. Many renderings are intended to be motion renderings, depicting the 3d object in motion through several successive frames in time. Moreover, the object being rendered may not be rigid, but may deform as it moves. Thus, the wire frame 110 can not only translate or rotate within the 3D space over successive frames, but the point cloud 100 may change from one frame of the rendering to another.

One technique to depict a 3D object computationally is to capture motion images of that object. For example, video of a human or anthropomorphic subject may be taken to create an avatar of that character for use in a gaming environment. The video technique may be particularly useful when attempting to capture a complex series of motions, which may be difficult to describe computationally. The motion images are deconstructed to their constituent frames. Each frame may then be used to construct a wire frame model and texture map of the 3D object. The wire frame model and texture map from each frame are combined to create the 3D rendering. It should be noted that a point cloud and/or wire frame mesh representation is only one possible input. Any computational descriptions of object surfaces that can be reduced to a point cloud is suitable for use according to the presently disclosed principles.

The problem of inconsistent tessellation is one that is created by the electronic nature of video capture. At least one drawback that may result from electronic video capture is that each frame of the video serves as an independent basis to create a point cloud. Therefore, the successive point clouds in each frame and their resulting wire meshes have no specific relationship to one another. Without a coherent wire frame of the 3D object throughout the video, it is difficult if not impossible to compress the data necessary to the rendering. For example, a coherent point cloud would permit the point cloud to be transmitted once, then successive frames to be described by differential information. This may reduce the data bandwidth load. Alternatively, post-production editing of the 3D object may be facilitated by having a consistent point cloud on which to operate through all video frames.

The present principles support processes for consistently meshing a moving/animated 3D object represented, for example only and without limitation, by a sequence of point clouds. A sparse set of representative frames, called keyframes, is spread across the timeline of the video. These keyframes are meshed and deformed such that their geometry matches that of other frames in the sequence. This achieves consistent tessellation among frames sharing a given keyframe. Such consistent tessellation may advantageously increase the performance of a computational rendering of 3D objects without a need for improvements in hardware performance. By contrast, prior approaches compute unrelated tessellation across successive frames.

Figure 3:
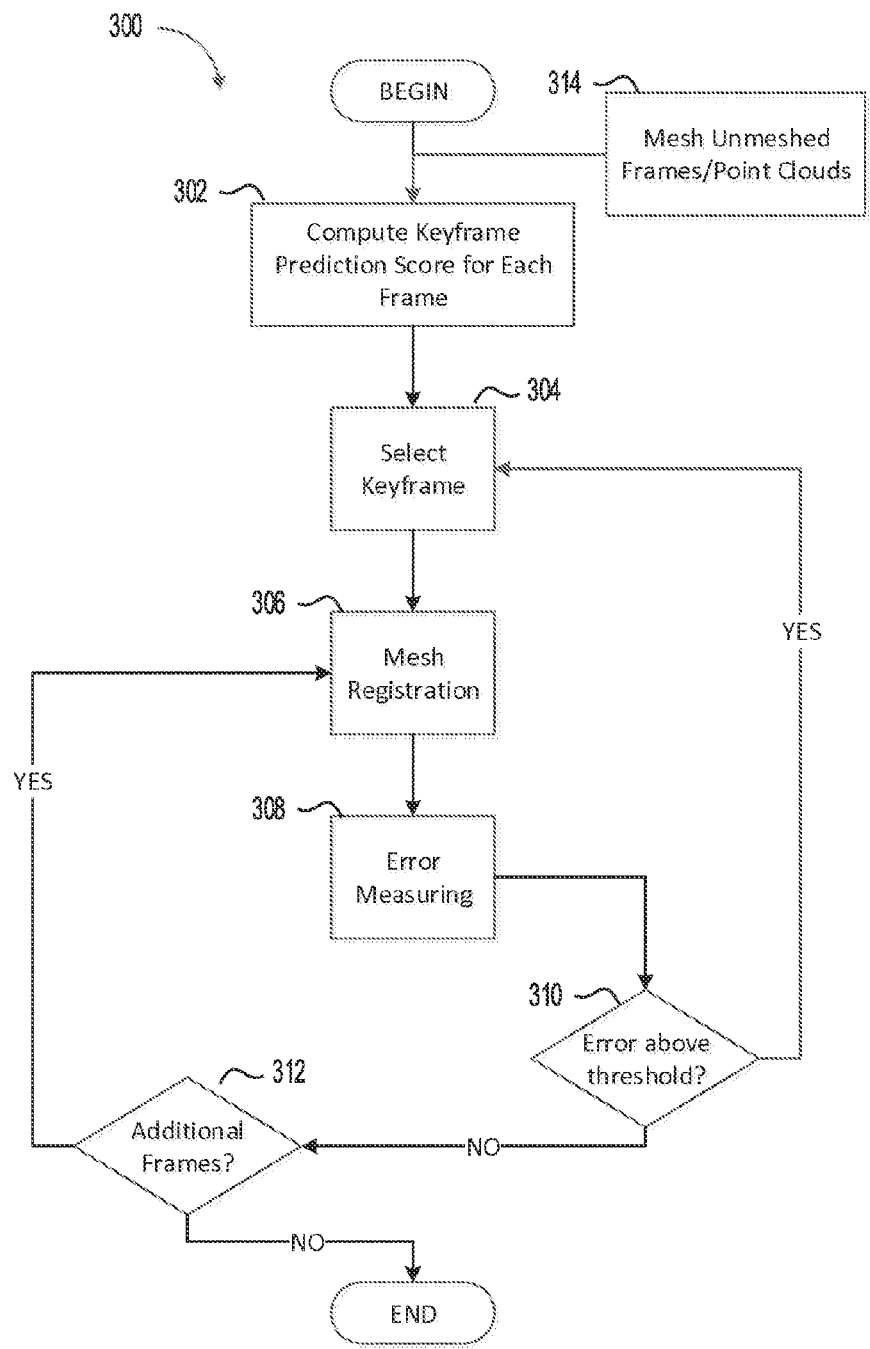
FIG. 3 shows a flowchart describing an illustrative process for consistent tessellation via topology-aware surface tracking consistent with a particular implementation of the presently disclosed principles.

Referring now to FIG. 3, illustrated is a flowchart 300 that describes a process for consistent tessellation via topology-aware surface tracking. Where the input surface information consists of a sequence of point clouds, a pre-processing step 314 of meshing the point clouds will be performed. The process then begins by computing a score for each frame, in step 302. More specifically, the computed score predicts how feasible it would be for each frame's point cloud to be modified or registered to properly conform with the surfaces of the same object described by the point clouds of nearby frames in the sequence. This process may also be termed "keyframe prediction scoring." Each frame has thus been assigned a keyframe prediction score.

Beginning with the frame having the highest keyframe prediction score, this keyframe may be selected, in step 304. The point cloud of the selected keyframe may be meshed, for example as by preprocessing step 314. Any number of meshing techniques known to those skilled in the art can be used for this purpose (e.g., Poisson Surface Reconstruction, without limitation). The keyframe wire mesh may then be deformed non-linearly, from frame to frame, such that its geometry fits other frames in the sequence of frames, in step 306. This process may also be termed "mesh registration." In certain embodiments, the mesh registration 306 may be performed sequentially on frames forward and/or backward in time from the keyframe within the scene. The magnitude of deformation in the keyframe mesh may thus be limited. Additionally, in general, the deformation is incremental in nature.

After mesh registration 306, the fidelity of reconstruction for each frame in the sequence may be evaluated, to decide whether the deformed mesh approximates the original frame geometry with acceptable accuracy, in step 308. This process may also be termed "error measuring." Any frame having an error measurement that exceeds a predetermined threshold or tolerance may be considered an exception frame. This may also be termed "exception handling." Exception handling is depicted in the flowchart 300 as decision 310, i.e., are there any exception frames? If there are exception frames, a new keyframe may be selected, as in step 304. In some implementations, the second keyframe is the frame having the second-highest keyframe prediction score. In a variant implementation, the prediction score is recalculated, step 302, with respect to all frames that are not prior selected keyframes, or have not been already registered to a prior selected keyframe. In that case, the keyframe having a highest predictive score from the second iteration may be selected as a second keyframe. That second keyframe may or may not be a frame having the second-highest predictive score from the first iteration. The second keyframe wire mesh may then be deformed to the geometry of the exception frames, as in step 306. Error measurement of the exception frames may be carried out as in step 308. The exception handling process, in step 310, repeats until all frames are described by some deformation of one or more keyframes.

There are several possible variants to the principles described above. For example, keyframe prediction scoring may be considered optional. The process 300 described above and with respect to FIG. 3 may still work with the omission of keyframe prediction scoring in step 302, although the results may be sub-optimal in some cases. Thus, a keyframe can be blindly chosen, and steps 304 through 310 reiterated until every frame is covered by some deformation of a keyframe. Or keyframes can be chosen either randomly or at regular subdivision time intervals and iterations performed until a global error measure no longer drops (and/or adjust those initial frames forward/backward in time to observe if the error measure drops).

Alternatively, every frame, or an arbitrarily chosen number of frames, such as every $n^{th}$ frame, may be treated as a keyframe, and tracked independently through the process 300 (i.e., a brute-force approach). Note here that each selected keyframe can then be processed in parallel. Additional discussion of parallel processing can be seen below. Having run the process 300 for each of the selected keyframes, selecting the minimum set of keyframes covering the whole sequence is equivalent to solving the classical set cover problem (SCP) by the dynamic programming optimization. Finally, the keyframe prediction in step 302, mesh registration in step 306, and error measurement in step 308 may each be implemented in various ways, as described below.

Figure 4:
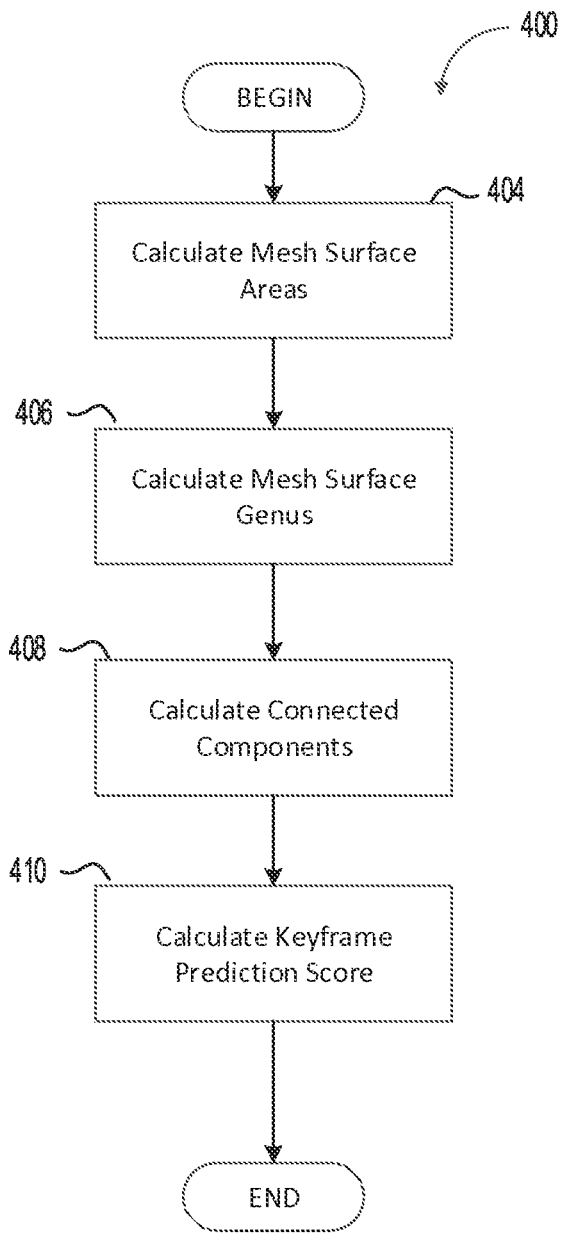
FIG. 4 shows an illustrative keyframe prediction step consistent with a particular implementation of the presently disclosed principles.

With reference to FIG. 4, the keyframe prediction step 302 is described in further detail. The keyframe prediction step 302 outputs a score for each frame in the sequence. The keyframe prediction score predicts the feasibility of any given frame, or more specifically, the point cloud defined in that frame, being chosen as a keyframe. The keyframe prediction score may be computed based on two observations. The first observation is that it may be easier to deform a triangle mesh of larger size to match surfaces of smaller area. This is because when a surface patch is expanding/shrinking, tessellation resolution is lost/gain. The second observation is that it may be easier to deform a surface of lower genus into a surface of higher genus. For example, it can be easier to deform a sphere into a torus than vice versa. Third, we observe it is easier to deform a surface with more connected components into one with fewer connected components, as the meshing algorithm might incorrectly merge independent subjects in contact.

Thus, given N frames of point clouds, the prediction scores are computed based on the following process 400. The point clouds of all frames in the sequence will have been meshed, as in preprocessing step 314. For example, the technique described by Kazhdan, et al. (2006) may be used. This yields triangle meshes for each point cloud, termed $\{T_1 \ldots T_N\}$. Non-triangular meshes derived from other techniques may be used as well. Next, the surface area of each mesh $\{T_1 \ldots T_N\}$ may be calculated, in step 404. The surface areas are termed $\{A_1 \ldots A_N\}$.

Furthermore, the surface genus of each mesh $\{T_1 \ldots T_N\}$ may be calculated, in step 406. The surface genus of each mesh can be calculated using Euler's formula, V−E+F=2−2 g, where V denotes the number of vertices or points 102, E denotes the number of edges 104, F denotes the number of faces 106, and g is an integer describing the surface genus of the mesh. The surface genus or each mesh may be termed $\{g_1 \ldots g_N\}$. As a third element of the keyframe prediction score, a number of connected components is calculated in step 408.

Finally, the keyframe prediction score for each mesh $\{T_1 \ldots T_N\}$ may be calculated, in step 410. The keyframe prediction score may be termed $\{S_1 \ldots S_N\}$. The keyframe prediction score for the $i^{th}$ mesh $(S_i)$ can compare the surface genus for the $i^{th}$ frame $(g_i)$ to the largest surface genus in the sequence $(g_{max})$. The keyframe prediction score can also compare the surface area of the $i^{th}$ frame $(A_i)$ to the largest surface area in the sequence $(A_{max})$. Certain embodiments may consider a keyframe prediction score as a sum of scores for each connected component in the frame. The expression C(i) is the number of connected components of the frame. Therefore, in one implementation, the keyframe prediction score may be given by the following formula:

$$S_i = \sum_{c \in C(i)} \left(1 + (g_{max} - g_c) + \left(\frac{A_c}{A_{max}+1}\right)\right)$$

In the above expression then, $(g_c)$ represents a surface genus of the connected components, and $(A_c)$ represents a surface area of the connected components. In some embodiments, as described above, the frames may be ordered according to their keyframe prediction score for precedence in selection as keyframes.

The mesh registration in step 306 is now described in further detail. In particular, a wire mesh 110, for example a triangle mesh as in this case, may be taken from a source frame s. The source mesh $(T_s)$ may be deformed so that its geometry approximates a destination point cloud at frame d. In essence, this may be a non-linear registration problem. For example, a prior approach to this problem is described in Li, et al. (2009). Briefly speaking, the method looks for a spatially-varying affine deformation field, $f_s^d: M \rightarrow M$, by minimizing a composite energy according to the expression:

$$\arg\min_{f_s^d} E := E_{fit} + E_{rigid} + E_{reg}$$

where $E_{fit}$ is the energy minimized when the deformed surface well fits the point cloud, $E_{rigid}$ is the energy minimized when the transformation maintain rigidity, and finally $E_{reg}$ is the energy minimized when the transformation varies smoothly.

According to one application of the presently disclosed principles, an additional energy term may be incorporated into the expression. The additional energy term, $E_{user}$, accepts external cues of deformation, acting as a user-defined constraint on the transformation. In certain implementations and applications, external cues can come from an arbitrary combination of one or more of the following sources:

A user interface (UI) through which users may input a sparse set of correspondence between mesh vertices and points;
  A skeleton and/or cage defining desired deformation at a very coarse scale;
  A sparse set of automatic trackers attached on the surface; and
  A sparse set of corresponding features or weights computed automatically based on image information, texture information point cloud information, or other sources.

The energy $E_{user}$ is thus minimized when the cues are satisfied. To summarize, $f_s^d$ is solved by $$\arg\min_{f_s^d} E := E_{fit} + E_{rigid} + E_{reg} + E_{user}$$

The error measuring in step 308 is now described in further detail. The source keyframe mesh ($M_s$) may be deformed according to mesh registration in step 306, to approximate the destination point cloud ($P_d$). One purpose of error measuring in step 308 is to determine how closely the deformed mesh approximates the underlying surface of the point cloud. If the error exceeds a predetermined tolerance or threshold, then another keyframe can be sought. Furthermore, in the embodiments described above in which the mesh registration in step 306 may be performed sequentially forward and/or backward in time from the keyframe, then it can also be presumed that the keyframe mesh may no longer be viable for use to track additional frames further in time away from the keyframe than the first frame in which the error exceeds a tolerance or threshold.

The error measuring in step 308 may consider both the geometry fidelity and rendering fidelity of the reconstruction. For example, the error measuring in step 308, error (e) may be computed from the equation $$e = d_{Haus}(M_s, P_d) + d_{RMS}(M_s, P_d) + \sum_{v \in \{V\}} \|Img(v, M_s) - Img(v, P_d)\|^2$$

where $d_{Haus}$ and $d_{RMS}$, respectively computes the Hausdorff distances and the RMS errors by projecting points $P_d$ onto mesh $M_s$. Together, the first and second terms measure the geometric errors in the projection. The third term, in contrast, measures the rendering quality of mesh $M_s$, by taking snapshots from several synthetic camera views $\{V\}$. In those embodiments in which color information is available, that information may be used for rendering colors. Otherwise, some of the surface properties, such as normal fields, curvature fields, and visual accessibility, are drawn in each color channel.

There are several possible variants for implementing the error measuring in step 308. For example, the signed distance functions can be computed for the two surfaces and integrate their differences. Alternatively, for example, cube/sphere maps may be computed for the rendering of the two surfaces and then their differences compared. The underlying effect of the error measuring in step 308 is to employ a quantifiable measure for visual similarity between the two surfaces.

The process in FIG. 3 for consistent tessellation via topology-aware surface tracking described above meshes a given set of point clouds using as few keyframes as possible, in a single pass. The fewer the number of keyframes that are needed, the higher tessellation consistency is achieved from frame to frame. Certain implementations do this sequentially, but in any case, each frame must be addressed. However, when a given sequence is lengthy, the processing can take considerable time. The basic principles are therefore resistant to speed increase by adding parallelism.

Figure 5:
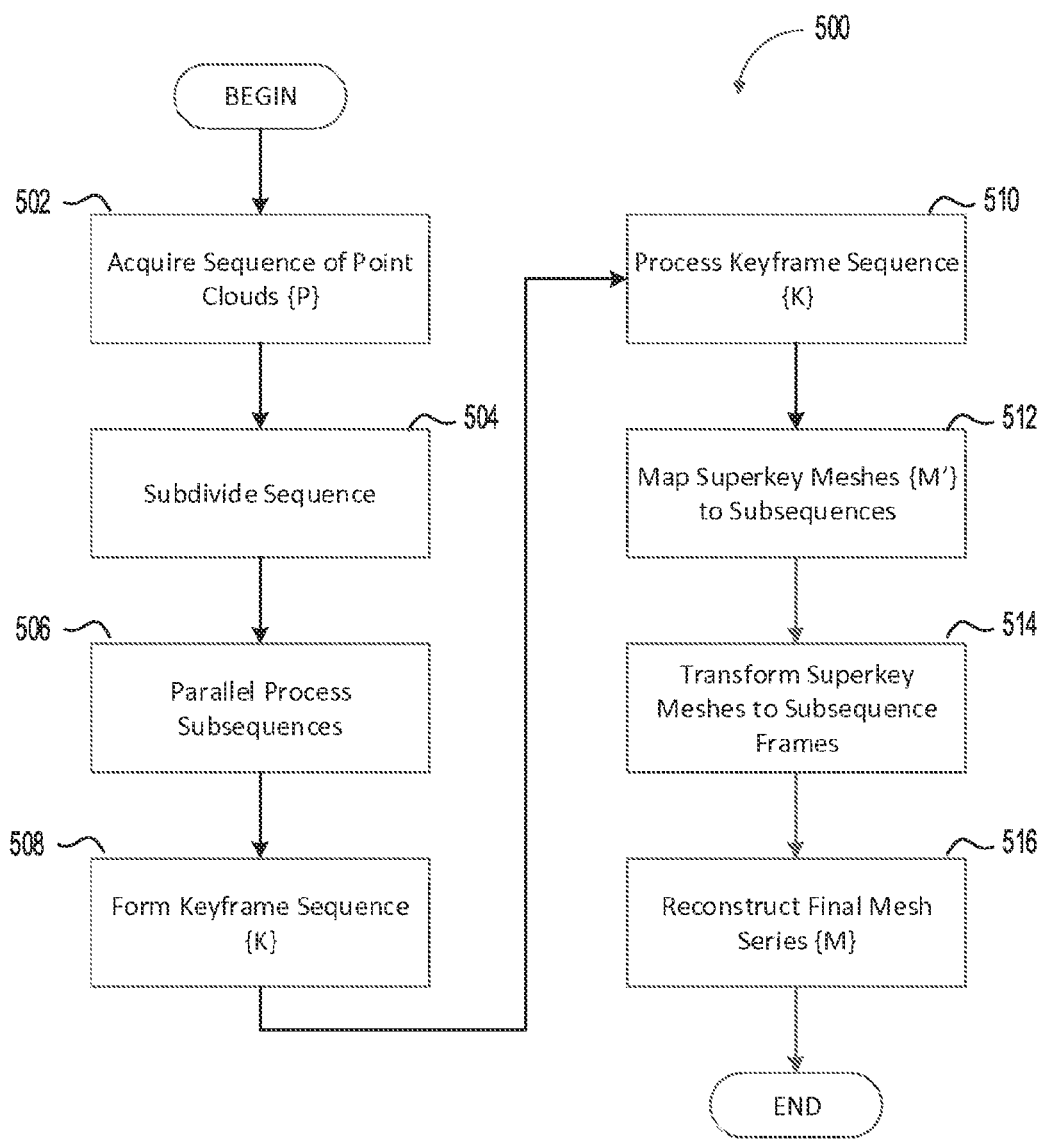
FIG. 5 shows a flowchart which describes an illustrative implementation of the process for consistent tessellation via topology-aware surface tracking.

Referring now to FIG. 5, illustrated is a flowchart of a process 500, which describes a variant according to another embodiment of the process for consistent tessellation via topology-aware surface tracking. This variant process 500 yield results with less consistency and/or accuracy, yet provide improved processing speed. The process can be summarized as follows:

Variant process 500 begins with the acquisition of a sequence of frames, in step 502. Each frame in the sequence has a point cloud describing an object to be rendered in motion. The term acquired can be used in this sense to mean acquiring video of a live object as described above. It can also mean the provision of such sequence of frames, however constructed.

The input sequence of point clouds $\{P\}$ may be split into n subsequences $\{\{P^1\}, \{P^2\}, \ldots \{P^n\}\}$, in step 504. Each subsequence $\{P^i\}$ may be processed in parallel using the process 300, or one of its variants as described above, in step 506. The result of step 506 may be a sequence of n keymeshes $\{\{K^1\}, \{K^2\}, \ldots \{K^n\}\}$ and corresponding groups of transformation fields, $\{\{T^1\}, \{T^2\}, \ldots \{T^n\}\}$ used to deform respective keymeshes $\{K^i\}$ into other frames. The sequence of n keymeshes $\{\{K^1\}, \{K^2\}, \ldots \{K^n\}\}$ may be concatenated as keymesh sequence $\{K\}$, in step 508.

The process 300, or one of its variants as described above, may be run on the keyframe sequence $\{K\}$, in step 510. The result of step 510 may be a set of one or more super keymeshes $\{M'\}$. The super keymeshes $\{M'\}$ are split into n super keymesh subsets $\{\{M'^1\}, \{M'^2\}, \ldots \{M'^n\}\}$ by mapping a respective $i^{th}$ super keymesh $\{M'^i\}$ to its corresponding subsequence $\{P^i\}$, in step 512.

The set of transformation fields $\{\{T\}, \{T^1\}, \{T^2\}, \ldots \{T^n\}\}$ may be applied to respective super keymesh subsets $\{\{M'^1\}, \{M'^2\}, \ldots \{M'^n\}\}$, in step 514. In certain implementations of the process 500, step 514 can also be carried out in parallel. The result of step 514 may be a subseries of reconstructed meshes $\{\{M^1\}, \{M^2\}, \ldots \{M^n\}\}$. The subseries of reconstructed meshes $\{\{M^1\}, \{M^2\}, \ldots \{M^n\}\}$ may be a concatenated final mesh series $\{M\}$, in step 516. The final mesh series $\{M\}$ approximates a sequence of point clouds $\{P\}$ using a minimum number of super keymeshes $\{M'\}$.

In another implementation of the process 500, the parallel meshing described above can be applied recursively to obtain a hierarchy of keymeshes that may be deeper than two levels. To apply parallel meshing recursively, the process at step 510 involving an application of the above process 300 may be replaced by calling the parallel meshing process 500 itself again.

In another illustrative example, the parallel process 500 can be used to improve the results of the basic process 300. The optimality of the original process 300 relies upon the robustness of its components of keyframe prediction in step 302, and mesh registration in step 306. However, there may be room possible for further optimization by merging adjacent keyframes. The process 500 describes a multi-level framework for performing such merging. For example, the value of n may be set to 1 in step 504. The resulting parallel process 500 may effectively try out alternative routes for keyframes reaching more frames. Thus, this variant of process 500 potentially deletes redundant keyframes, if the frames they covered are also reachable by other keyframes with still broader reach.

The sequence $\{P\}$ can also be divided temporally. Alternatively, according to still another modification, frames within the sequence can be divided spatially, for example, by position within the scene (halves, quadrants, etc. or the like). In addition, frames within the sequence can be divided according to one or more subsets of 3D objects appearing therein. That is, particular discrete 3D objects in the scene are tracked within the frames wherever they may appear, and are simplified by the application of keyframe meshes describing those 3D objects.

In still another implementation of the parallel processing described according to process 500, it is considered that some division of the sequence {P} into subsequences {{$P^1$}, {$P^2$}, . . . {$P^n$}} may be arbitrary with respect to frame contents. Frames near the boundaries of subsequences will be registered by or according to keyframes within their respective sequences. However, these similar boundary frames may have been adequately registered by a single common keyframe. Therefore, in order to avoid redundant keyframes near group boundaries, the frames covered by the two keyframes nearest the boundary are joined into a new group. The basic keyframe registration algorithm 300 is applied to this new boundary group, in an attempt to merge the two keyframes.

Figure 6:
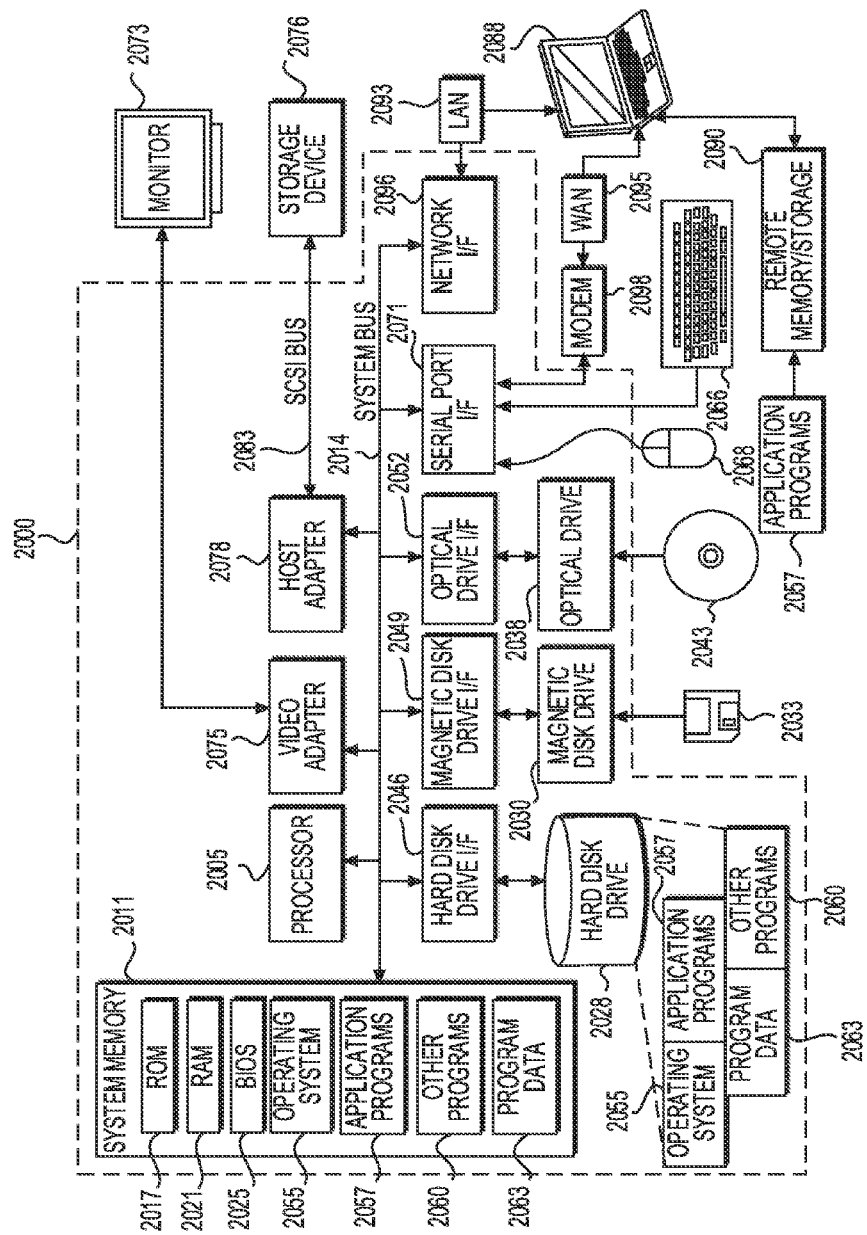
FIG. 6 shows a simplified block diagram of an illustrative computer system with which the present consistent tessellation via topology-aware surface tracking may be implemented.

Turning now to FIG. 6, illustrated is a simplified block diagram of an exemplary computer system 2000 such as a PC, client device, or server with which the present consistent tessellation via topology-aware surface tracking may be implemented. Computer system 2000 includes a processing unit 2005, a system memory 2011, and a system bus 2014 that couples various system components including the system memory 2011 to the processing unit 2005. The system bus 2014 may be any of several types of bus structures including a memory bus or memory controller, a peripheral bus, and a local bus using any of a variety of bus architectures. The system memory 2011 includes read only memory ("ROM") 2017 and random access memory ("RAM") 2021. A basic input/output system ("BIOS") 2025, containing the basic routines that help to transfer information between elements within the computer system 2000, such as during startup, is stored in ROM 2017. The computer system 2000 may further include a hard disk drive 2028 for reading from and writing to an internally disposed hard disk (not shown), a magnetic disk drive 2030 for reading from or writing to a removable magnetic disk 2033 (e.g., a floppy disk), and an optical disk drive 2038 for reading from or writing to a removable optical disk 2043 such as a CD (compact disc), DVD (digital versatile disc), or other optical media. The hard disk drive 2028, magnetic disk drive 2030, and optical disk drive 2038 are connected to the system bus 2014 by a hard disk drive interface 2046, a magnetic disk drive interface 2049, and an optical drive interface 2052, respectively. The drives and their associated computer readable storage media provide non-volatile storage of computer readable instructions, data structures, program modules, and other data for the computer system 2000. Although this illustrative example shows a hard disk, a removable magnetic disk 2033, and a removable optical disk 2043, other types of computer readable storage media which can store data that is accessible by a computer such as magnetic cassettes, flash memory cards, digital video disks, data cartridges, random access memories ("RAMs"), read only memories ("ROMs"), and the like may also be used in some applications of the present consistent tessellation via topology-aware surface tracking. In addition, as used herein, the term computer readable storage medium includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 2033, optical disk 2043, ROM 2017, or RAM 2021, including an operating system 2055, one or more application programs 2057, other program modules 2060, and program data 2063. A user may enter commands and information into the computer system 2000 through input devices such as a keyboard 2066 and pointing device 2068 such as a mouse. Other input devices (not shown) may include a microphone, joystick, game pad, satellite dish, scanner, trackball, touchpad, touch screen, touch-sensitive module or device, gesture-recognition module or device, voice recognition module or device, voice command module or device, or the like. These and other input devices are often connected to the processing unit 2005 through a serial port interface 2071 that is coupled to the system bus 2014, but may be connected by other interfaces, such as a parallel port, game port, or USB. A monitor 2073 or other type of display device is also connected to the system bus 2014 via an interface, such as a video adapter 2075. In addition to the monitor 2073, personal computers typically include other peripheral output devices (not shown), such as speakers and printers. The illustrative example shown in FIG. 6 also includes a host adapter 2078, a Small Computer System Interface ("SCSI") bus 2083, and an external storage device 2076 connected to the SCSI bus 2083.

The computer system 2000 is operable in a networked environment using logical connections to one or more remote computers, such as a remote computer 2088. The remote computer 2088 may be selected as another personal computer, a server, a router, a network PC, a peer device, or other common network node, and typically includes many or all of the elements described above relative to the computer system 2000, although only a single representative remote memory/storage device 2090 is shown in FIG. 6. The logical connections depicted in FIG. 6 include a local area network ("LAN") 2093 and a wide area network ("WAN") 2095. Such networking environments are often deployed, for example, in offices, enterprise-wide computer networks, intranets, and the Internet.

When used in a LAN networking environment, the computer system 2000 is connected to the local area network 2093 through a network interface or adapter 2096. When used in a WAN networking environment, the computer system 2000 typically includes a broadband modem 2098, network gateway, or other means for establishing communications over the wide area network 2095, such as the Internet. The broadband modem 2098, which may be internal or external, is connected to the system bus 2014 via a serial port interface 2071. In a networked environment, program modules related to the computer system 2000, or portions thereof, may be stored in the remote memory storage device 2090. It is noted that the network connections shown in FIG. 6 are illustrative and other means of establishing a communications link between the computers may be used depending on the specific needs of an application of the present consistent tessellation via topology-aware surface tracking. It may be desirable and/or advantageous to enable other types of computing platforms other than the computer system 2000 to implement the present consistent tessellation via topology-aware surface tracking in some applications.

Figure 7:
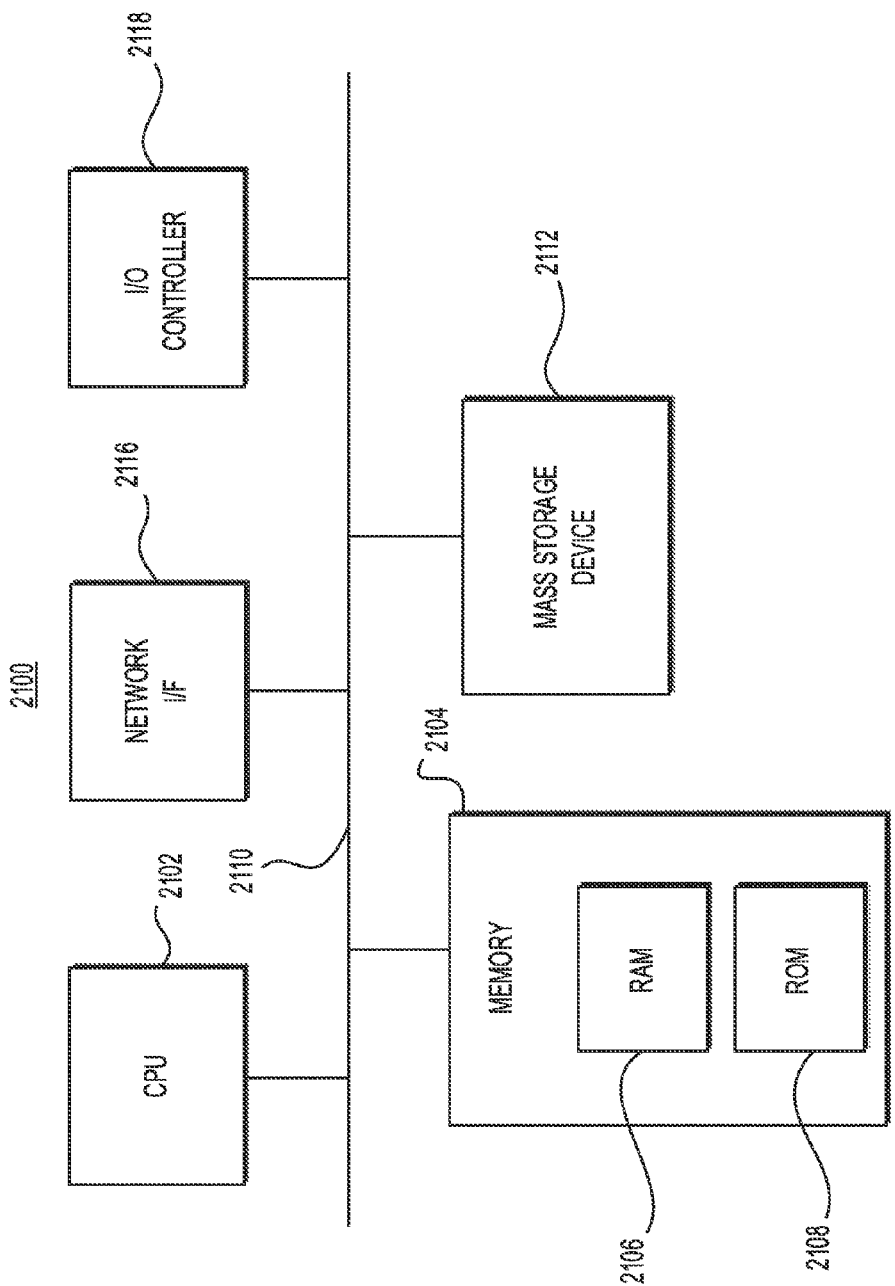
FIG. 7 shows an illustrative architecture for a device capable of executing the various components described herein for providing the present consistent tessellation via topology-aware surface tracking.

FIG. 7 shows an illustrative architecture 2100 for a device capable of executing the various components described herein for providing the present consistent tessellation via topology-aware surface tracking. Thus, the architecture 2100 illustrated in FIG. 7 shows an architecture that may be adapted for a server computer, mobile phone, a PDA, a smartphone, a desktop computer, a netbook computer, a tablet computer, GPS device, multimedia gaming console, and/or a laptop computer. The architecture 2100 may be utilized to execute any aspect of the components presented herein.

The architecture 2100 illustrated in FIG. 7 includes a CPU (Central Processing Unit) 2102, a system memory 2104, including a RAM 2106 and a ROM 2108, and a system bus 2110 that couples the memory 2104 to the CPU 2102. A basic input/output system containing the basic routines that help to transfer information between elements within the architecture 2100, such as during startup, is stored in the ROM 2108. The architecture 2100 further includes a mass storage device 2112 for storing software code or other computer-executed code that is utilized to implement applications, the file system, and the operating system.

The mass storage device 2112 is connected to the CPU 2102 through a mass storage controller (not shown) connected to the bus 2110. The mass storage device 2112 and its associated computer-readable storage media provide non-volatile storage for the architecture 2100. Although the description of computer-readable storage media contained herein refers to a mass storage device, such as a hard disk or CD-ROM drive, it may be appreciated by those skilled in the art that computer-readable storage media can be any available storage media that can be accessed by the architecture 2100.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 2100.

According to various embodiments, the architecture 2100 may operate in a networked environment using logical connections to remote computers through a network. The architecture 2100 may connect to the network through a network interface unit 2116 connected to the bus 2110. It may be appreciated that the network interface unit 2116 also may be utilized to connect to other types of networks and remote computer systems. The architecture 2100 also may include an input/output controller 2118 for receiving and processing input from a number of other devices, including a keyboard, mouse, or electronic stylus (not shown in FIG. 7). Similarly, the input/output controller 2118 may provide output to a display screen, a printer, or other type of output device (also not shown in FIG. 7).

It may be appreciated that the software components described herein may, when loaded into the CPU 2102 and executed, transform the CPU 2102 and the overall architecture 2100 from a general-purpose computing system into a special-purpose computing system customized to facilitate the functionality presented herein. The CPU 2102 may be constructed from any number of transistors or other discrete circuit elements, which may individually or collectively assume any number of states. More specifically, the CPU 2102 may operate as a finite-state machine, in response to executable instructions contained within the software modules disclosed herein. These computer-executable instructions may transform the CPU 2102 by specifying how the CPU 2102 transitions between states, thereby transforming the transistors or other discrete hardware elements constituting the CPU 2102.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2100 in order to store and execute the software components presented herein. It may also be appreciated that the architecture 2100 may include other types of computing devices, including handheld computers, embedded computer systems, smartphones, PDAs, and other types of computing devices known to those skilled in the art. It is also contemplated that the architecture 2100 may not include all of the components shown in FIG. 7, may include other components that are not explicitly shown in FIG. 7, or may utilize an architecture completely different from that shown in FIG. 7.

Figure 8:
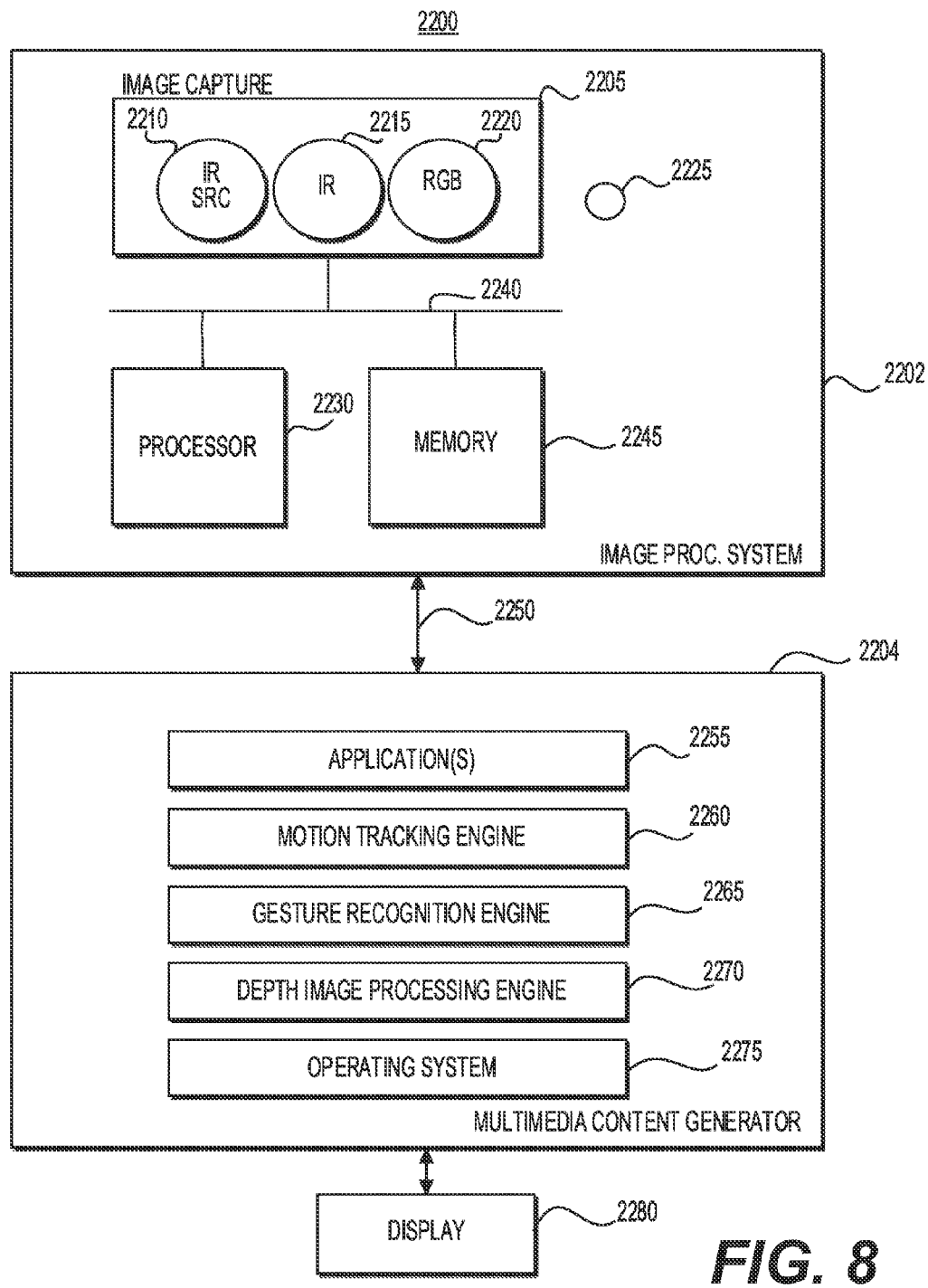
FIG. 8 shows illustrative functional components of the image processing system operative to capture input image data to serve as a source of frames for the presently disclosed system and method for consistent tessellation via topology-aware surface tracking.

FIG. 8 shows illustrative functional components of the image processing system 2202 and multimedia content generator 2204 that may be used to capture input image data to serve as a source of frames for the presently disclosed system and method for consistent tessellation via topology-aware surface tracking. The image processing system 2202 may be configured to capture video with depth information including a depth image that may include depth values via any suitable technique including, for example, time-of-flight, structured light, stereo image, or the like. In some implementations, the image processing system 2202 may organize the calculated depth information into "Z layers," or layers that may be perpendicular to a Z-axis extending from the depth camera along its line of sight.

As shown in FIG. 8, the image processing system 2202 includes an image capture component 2205. The image capture component 2205 may be configured to operate as a depth camera that may capture a depth image of a scene. The depth image may include a two-dimensional ("2D") pixel area of the captured scene where each pixel in the 2D pixel area may represent a depth value such as a distance in, for example, centimeters, millimeters, or the like of an object in the captured scene from the camera. In this example, the image capture component 2205 includes an IR light component 2210, an IR camera 2215, and a visible light RGB camera 2220 that may be configured in an array, as shown, or in an alternative geometry.

Various techniques may be utilized to capture depth video frames. For example, in time-of-flight analysis, the IR light component 2210 of the image processing system 2202 may emit an infrared light onto the capture area and may then detect the backscattered light from the surface of one or more targets and objects in the capture area using, for example, the IR camera 2215 and/or the RGB camera 2220. In some embodiments, pulsed infrared light may be used such that the time between an outgoing light pulse and a corresponding incoming light pulse may be measured and used to determine a physical distance from the image processing system 2202 to a particular location on the targets or objects in the capture area. Additionally, the phase of the outgoing light wave may be compared to the phase of the incoming light wave to determine a phase shift. The phase shift may then be used to determine a physical distance from the camera system to a particular location on the targets or objects. Time-of-flight analysis may be used to indirectly determine a physical distance from the image processing system 2202 to a particular location on the targets or objects by analyzing the intensity of the reflected beam of light over time via various techniques including, for example, shuttered light pulse imaging.

In other implementations, the image processing system 2202 may use structured light to capture depth information. In such an analysis, patterned light (i.e., light displayed as a known pattern such as a grid pattern or a stripe pattern) may be projected onto the capture area via, for example, the IR light component 2210. Upon striking the surface of one or more targets or objects in the capture area, the pattern may become deformed in response. Such a deformation of the pattern may be captured by, for example, the IR camera 2215 and/or the RGB camera 2220 and may then be analyzed to determine a physical distance from the camera system to a particular location on the targets or objects.

The image processing system 2202 may utilize two or more physically separated cameras that may view a capture area from different angles, to obtain visual stereo data that may be resolved to generate depth information. Other types of depth image arrangements using single or multiple cameras can also be used to create a depth image. The image processing system 2202 may further include a microphone 2225. The microphone 2225 may include a transducer or sensor that may receive and convert sound into an electrical signal. The microphone 2225 may be used to reduce feedback between the image processing system 2202 and the multimedia content generator 2204 in a target recognition, analysis, and tracking system 2200. Additionally, the microphone 2225 may be used to receive audio signals that may also be provided by viewer to control applications such as game applications, non-game applications, or the like that may be executed by the multimedia content generator 2204.

The image processing system 2202 may further include a processor 2230 that may be in operative communication with the image capture component 2205 over a bus 2240. The processor 2230 may include a standardized processor, a specialized processor, a microprocessor, or the like that may execute instructions that may include instructions for storing profiles, receiving the depth image, determining whether a suitable target may be included in the depth image, converting the suitable target into a skeletal representation or model of the target, or any other suitable instruction. The image processing system 2202 may further include a memory component 2245 that may store the instructions that may be executed by the processor 2230, images or frames of images captured by the cameras, user profiles or any other suitable information, images, or the like. According to one example, the memory component 2245 may include RAM, ROM, cache, Flash memory, a hard disk, or any other suitable storage component. As shown in FIG. 8, the memory component 2245 may be a separate component in communication with the image capture component 2205 and the processor 2230. Alternatively, the memory component 2245 may be integrated into the processor 2230 and/or the image capture component 2205. In one embodiment, some or all of the components of the image processing system 2202 are located in a single housing.

The image processing system 2202 and particularly image capture component 2205 described above are with reference to the acquisition of images taken from a physical environment. According to another embodiment, the image capture component 2205 and/or image processing system 2202 are configured to receive a computational description of a three-dimensional scene to be rendered, and/or image data describing images of that three-dimensional scene. In that case, the computational description may include, and/or the derived image data can be made to include a priori depth information. For each image of the three-dimensional scene, the underlying depth information can be conveniently organized as a depth image for further processing as described herein.

The image processing system 2202 operatively communicates with the multimedia content generator 2204 over a communication link 2250. The communication link 2250 may be a wired connection including, for example, a USB (Universal Serial Bus) connection, a Firewire connection, an Ethernet cable connection, or the like and/or a wireless connection such as a wireless IEEE 802.11 connection. The multimedia content generator 2204 can provide a clock to the image processing system 2202 that may be used to determine when to capture, for example, a scene via the communication link 2250. The image processing system 2202 may provide the depth information and images captured by, for example, the IR camera 2215 and/or the RGB camera 2220, including a skeletal model and/or facial tracking model that may be generated by the image processing system 2202, to the multimedia content generator 2204 via the communication link 2250. The multimedia content generator 2204 may then use the skeletal and/or facial tracking models, depth information, and captured images to, for example, create a virtual screen, adapt the user interface, and control apps/games 2255. According to a further embodiment, the provision of a computational description, image data, and/or a depth image can be made directly to the multimedia content generator 2204, obviating the need for the image processing system 2202, or at least some of its elements.

A motion tracking engine 2260 uses the skeletal and/or facial tracking models and the depth information to provide a control output to one or more apps/games 2255 running on the multimedia content generator 2204 to which the image processing system 2202 is coupled. The information may also be used by a gesture recognition engine 2265, depth image processing engine 2270, and/or operating system 2275.

The depth image processing engine 2270 uses the depth images to track motion of objects, such as the user and other objects. The depth image processing engine 2270 may typically report to the operating system 2275 an identification of each object detected and the location of the object for each frame. The operating system 2275 can use that information to update the position or movement of an avatar, for example, or other images shown on a display, for example display 2280, or to perform an action on the user interface.

The gesture recognition engine 2265 may utilize a gestures library (not shown) that can include a collection of gesture filters, each comprising information concerning a gesture that may be performed, for example, by a skeletal model (as the user moves). The gesture recognition engine 2265 may compare the frames captured by the image processing system 2202 in the form of the skeletal model and movements associated with it to the gesture filters in the gesture library to identify when a user (as represented by the skeletal model) has performed one or more gestures. Those gestures may be associated with various controls of an application and direct the system to open the personalized home screen as described above. Thus, the multimedia content generator 2204 may employ the gestures library to interpret movements of the skeletal model and to control an operating system or an application running on the multimedia console based on the movements.

In some implementations, various aspects of the functionalities provided by the apps/games 2255, motion tracking engine 2260, gesture recognition engine 2265, depth image processing engine 2270, and/or operating system 2275 may be directly implemented on the image processing system 2202 itself. In another embodiment, the functions and or features described above with respect to the multimedia content generator 2204 may be performed and/or incorporated into a multimedia gaming console 2300, described above and further below. For example the image processing system 2202 may provide image information to the multimedia gaming console 2300 to implement a natural user interface, among other features and functions.

Based on the foregoing, it may be appreciated that technologies for implementing consistent tessellation via topology-aware surface tracking have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and may not be construed as limiting. Various modifications and changes may be made to the subject matter described herein without following the example embodiments and applications illustrated and described, and without departing from the true spirit and scope of the present disclosure, which is set forth in the following claims.

What is claimed:

1. A computer-implemented method for consistent tessellation when rendering one or more three-dimensional objects in a video, comprising:
    providing a first sequence of frames, each frame of the first sequence having one of a first plurality of computational representations of one or more three-dimensional objects depicted in each frame;
    providing a wire frame mesh corresponding to each computational representation not including a wire frame mesh;
    selecting one frame of the first sequence as a first keyframe, the first keyframe having a first key mesh corresponding to a respective computational representation from the first plurality;
    for each frame in the first sequence of frames not selected as the first keyframe, calculating a first transformation field describing a transformation of the first key mesh to approximate the computational representation of the surface of the one or more three-dimensional objects depicted in the respective frame;
    for each frame in the first sequence of frames not selected as the first keyframe, substituting the first key mesh transformed according to the respective transformation field for that frame in place of the respective one of the first plurality of computational representations; and
    applying the substituted transformed first key mesh when performing the video rendering.

2. The computer-implemented method of claim 1, further comprising:
    for each frame in the first sequence, calculating a keyframe prediction score measuring feasibility for each respective one of the first plurality of computational representations to be modified to conform with the representation of the first three-dimensional object described by the computational representations of the other frames in the sequence; and
    selecting the frame in the first sequence having the greatest keyframe prediction score as the first keyframe.

3. The computer-implemented method of claim 2, further comprising calculating a keyframe prediction score for each frame in the first sequence by comparing at least one of:
    i) a surface genus describing a triangular mesh of each one of the first plurality of computational representations with a maximum surface genus among all triangular meshes of the first plurality of computational representations in the first sequence; and
    ii) a surface area of a triangular mesh of each one of the first plurality of computational representations with a maximum surface area among all triangular meshes of the first plurality of computational representations in the first sequence.

4. The computer-implemented method of claim 1, further comprising:
    for each frame in the first sequence of frames not selected as the first keyframe, calculating a transformation field that minimizes a composite energy in the transformation between the first key mesh and the representation of the surface of the first three-dimensional object in the respective frame.

5. The computer-implemented method of claim 4, further comprising:
    calculating a transformation field that minimizes a composite energy in the transformation between the first key mesh and the representation of the surface of the first three-dimensional object in the respective frame, including satisfying a user-defined constraint on the transformation.

6. The computer-implemented method of claim 1, further comprising:
    for each frame in the first sequence of frames not selected as the first keyframe, calculating an error measurement corresponding to the visual similarity between a respective point cloud of the first plurality of computational representations, and the transformation of the first key mesh to approximate the representation of the surface of the one or more three-dimensional objects in the respective frame;

responsive to any frame in the first sequence of frames having an error measurement that exceeds a predetermined threshold, selecting a second keyframe, the second keyframe having a second key mesh from the first plurality of computational representations; and for each frame in the first sequence of frames having an error measurement that exceeds the predetermined threshold, calculating a second transformation field describing a transformation of the second key mesh to approximate the surface of the one or more three-dimensional objects in the respective frame, and substituting the second key mesh transformed according to the respective second transformation field for that frame in place of the respective one of the first plurality of computational representations.

7. The computer-implemented method of claim 6, further comprising:
for each frame in the first sequence of frames not selected as the first keyframe, calculating an error measurement related to at least one of:
i) a Hausdorff distance between a respective computational representations, and the transformation of the first key mesh to approximate the representation of the one or more three-dimensional objects in the respective frame;
ii) a root mean square error of projecting a respective computational representations onto the transformation of the first key mesh to approximate the representation of the one or more three-dimensional objects in the respective frame; and
iii) a comparative rendered quality of one or more images of the respective computational representations of the first plurality of computational representations, and the transformation of the first key mesh to approximate the representation of the one or more three-dimensional objects in the respective frame.

8. The computer-implemented method of claim 1, further comprising
for each frame in the first sequence not selected as the first keyframe, calculating a first transformation field describing a transformation of the first key mesh to approximate the representation of the one or more three-dimensional objects in the respective frame, temporally sequentially along the first sequence of frames forward or backward from the first keyframe.

9. The computer-implemented method of claim 8, further comprising
for each frame in the first sequence not selected as the first keyframe, calculating a first transformation field describing a transformation of the first key mesh to approximate the representation of the one or more three-dimensional objects in the respective frame and an incremental transformation of an adjacent transformation field along the first sequence.

10. The computer-implemented method according to claim 1, wherein the computational descriptions comprise at least one of a point cloud or a wire frame mesh.

11. A computer-implemented method for consistent tessellation when rendering one or more three-dimensional objects in a video, comprising:
providing a first sequence of frames, each frame of the first sequence having one of a first plurality of computational representations of one or more three-dimensional objects depicted in each frame;
providing a wire frame mesh corresponding to each computational representation not including a wire frame mesh;
dividing the first sequence of frames into a first plurality of subsequences;
selecting one frame of each subsequence as one of a first set of keyframes in a key sequence, each of the keyframes having one of a first plurality of key meshes from the first plurality of point clouds;
for each frame not selected as a keyframe, calculating a first transformation field describing a transformation of the key mesh corresponding to a respective keyframe chosen from that subsequence, to approximate the representation of the one or more three-dimensional objects in the respective frame;
selecting one frame of the key sequence as a first super keyframe, the first super keyframe having a first super key mesh;
for each frame not selected as a keyframe, substituting the first super key mesh transformed according to the respective transformation field for that frame in place of the respective one of the first plurality of computational representations; and
applying the substituted transformed first super key mesh when performing the video rendering.

12. The computer-implemented method of claim 11, further comprising:
selecting a plurality of frames of the key sequence as a first super keyframe, the first super keyframe having one of a plurality of super key meshes;
mapping one of the super key meshes to a nearest subsequence; and
substituting a correspondingly mapped one of the super key meshes, transformed according to the respective transformation field for that frame, in place of the respective one of the first plurality of computational representations.

13. The computer-implemented method of claim 11, further comprising:
recursively applying the dividing, selecting a first set of keyframes, calculating, selecting a first super keyframe, and substituting to each subsequence to obtain a hierarchy of key meshes.

14. The computer-implemented method of claim 11, further comprising
carrying out the selecting a first set of keyframes and calculating a first transformation field with respect to each subsequence in parallel.

15. The computer-implemented method of claim 11, further comprising:
dividing the first sequence of frames into a first plurality of subsequences in which the subsequences comprise all frames of the first sequence; and
selecting one frame of each subsequence as one of a first set of keyframes in a key sequence, in which the keyframes are not the same frame of the first sequence.

16. The computer-implemented method of claim 11, further comprising:
dividing the first sequence of frames into a first plurality of subsequences in which the subsequences are organized either
i) temporally,
ii) spatially according to the context of the first sequence of frames, or iii) according to commonality of the one or more three-dimensional objects represented in each subsequence.

17. A system for consistent tessellation when rendering one or more three-dimensional objects in a video, comprising:

one or more processors; and one or more machine-readable memories storing computer-readable instructions which, when executed by the one or more processors, cause the one or more processors to perform a computer-implemented method comprising the steps of:

providing a first sequence of frames, each frame of the first sequence having one of a first plurality of computational representations of one or more three-dimensional objects depicted in each frame;

providing a wire frame mesh corresponding to each computational representation not including a wire frame mesh;

selecting one frame of the first sequence as a first keyframe, the first keyframe having a first key mesh corresponding to a respective computational representation from the first plurality;

for each frame in the first sequence of frames not selected as the first keyframe, calculating a first transformation field describing a transformation of the first key mesh to approximate the computational representation of the one or more three-dimensional objects in the respective frame;

for each frame in the first sequence of frames not selected as the first keyframe, substituting the first key mesh transformed according to the respective transformation field for that frame in place of the respective one of the first plurality of computational representations; and applying the substituted transformed first key mesh when performing the video rendering.

18. The system of claim 17, further comprising an image processing system having an image capture component operative to capture image data including depth information and an image processor for processing the image data and depth information into a computational representation of a three-dimensional object.

19. The system of claim 18 in which the image capture component uses one of stereoscopic imaging, structured light analysis, or time-of-flight analysis to capture depth information.

20. The system of claim 18, further comprising an image capture component including a plurality of cameras, the image processor being operative to resolve visual stereo data from the plurality of physically separated cameras to generate depth information.

* * * * *